T. W. LUCKE.
TIRE EMPLACING TOOL.
APPLICATION FILED SEPT. 6, 1910.
1,035,456.
Patented Aug. 13, 1912.
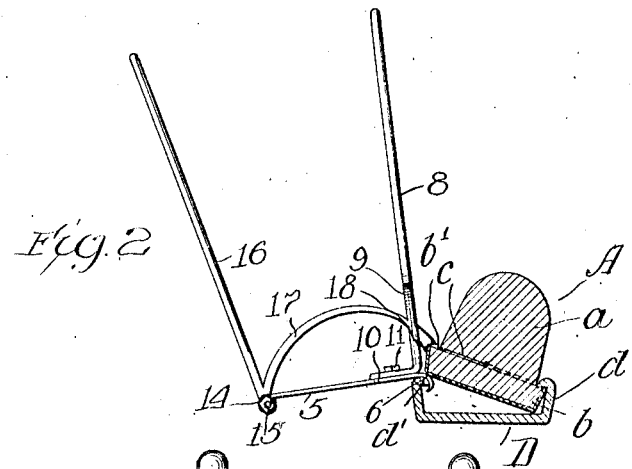
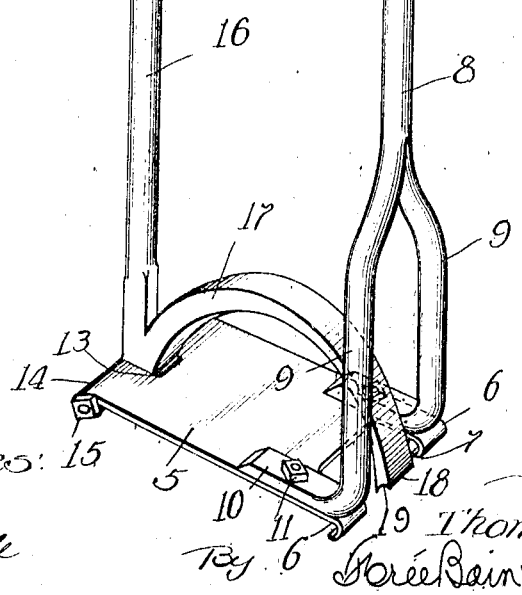

UNITED STATES PATENT OFFICE.

THOMAS W. LUCKE, OF CHICAGO, ILLINOIS.

TIRE-EMPLACING TOOL.

1,035,456.  Specification of Letters Patent.  Patented Aug. 13, 1912.

Application filed September 6, 1910.  Serial No. 580,594.

*To all whom it may concern:*

Be it known that I, THOMAS W. LUCKE, a citizen of the United States, residing at Chicago, in the county of Cook and State of Illinois, have invented certain new and useful Improvements in Tire-Emplacing Tools, of which the following is a specification.

My invention relates to tire-emplacing tools, and has for its general object to provide a cheap, handy, and efficient tool for applying laterally flanged tires to clencher rims.

In my prior Patent No. 943,430, December 14, 1909, I have shown and described a solid vehicle tire provided with laterally extending base flanges to be forced into a solid clencher channel rim, and it is particularly for the application of tire requiring such treatment that my present invention is designed.

In the drawings, Figure 1 is a perspective view of an embodiment of my invention; and Fig. 2 is a side elevation thereof as employed in the emplacement of a tire of the character described in my said prior patent.

As shown in said drawing, the tire, indicated at A, comprises a body, a, and a base, b, projecting laterally, as at b', beyond the body and provided with transverse strengthening wires, c, lying in substantially the upper plane of the base, each said transverse wire extending only partially across the full width of the base in order that the base may be capable of some lateral compression. The channel rim, D, is of unitary construction comprising the side wings, d, provided with inturned clencher flanges, d', arranged when the tire is in place to overlie the shoulders, b', formed by the base projections of the tire.

The tire-emplacing appliance shown comprises a foot, or base, 5, having at what I will term its front end projecting toes, 6—6, spaced apart, and each provided at its end with an undercurled hook, 7, for engagement with a rim. To the front of the base or foot is attached a handle or lever, 8, preferably bifurcated at its lower end, having its two arms, 9—9, bent rearwardly as at 10 at their lower extremities, and secured rigidly, as by bolts 11, to the opposite sides of the foot, so as to aline vertically with the toes, 6—6, thereof, and to place the lever 8 close to vertical alinement with the hooks, 7.

The heel of the plate is centrally cut away as at 13 and the ends of the remaining portions are rolled into pintle barrels, 14, to receive the pintle 15 on which is pivotally mounted a lever 16 having projecting forwardly therefrom an arm 17 of arm form, the free extremity of which may work through the space between the toe members, 6—6, when the lever 16 is thrown forward. The end 18 of said arm is preferably thickened somewhat, as shown in the drawing, and its extremity is recessed, as at 19, across its face or in a direction parallel with the pintle, 15, such recess being preferably a rather abrupt concave, such concaved end being adapted for engagement with the wheel tire.

In practice, the appliance is employed after the fashion shown in Fig. 2, the hook 7 being engaged with one clencher flange d' of the rim D so that the lever 8 and foot 5 may be rocked transversely of the wheel with the hook-engaged flange d' as a fulcrum, while simultaneously or otherwise, the hand lever 16 may be rocked with the other hand about its pivotal axis. Now, it will be understood that assuming the tire to have been partially emplaced as shown in Fig. 1, the concaved end of the arm 17 may be brought into engagement with the edge of the tire flange, and then by rocking the lever 16 inwardly, or toward the wheel, downward pressure may be exerted upon the tire to force it downward into place, the laterally-acting component of the force applied through arm 7, being augmented or created by the forcing over of the lever 8 toward the tire with a resultant rocking of the entire instrument with the hook-engaged rim flange d' as a fulcrum, as heretofore described. By such arrangement the operator may apply both transverse and vertical pressure simultaneously upon the tire yet the amount of force applied in each direction may be independently varied by appropriate movement of the two levers. Thus, forward movement of lever 16, toward the tire, obviously applies vertical pressure with a very inappreciable transverse component, and forward movement of lever 8, and the entire instrument, accompanied by sufficient backward movement of lever 16 to maintain arm end 19 at a uniform level, will apply transverse pressure upon the tire with only a relatively slight downward pressure. It will be observed, therefore, that the operator by suitably combining these operations of the levers 16 and 8 may work the tire in place with little waste of energy. Further, variations in the size of the parts of the instrument may be made for varying pressure effects, and to adapt the instrument for manipulation on different tire and rim constructions.

While I have herein described my invention as employed in the application of a particular construction of tire, it will be readily apparent that the device is applicable to other forms of tire, and that many changes in the mechanical details might be made therein without departure from the spirit of this invention and within the scope of the appended claims.

What I claim is:

1. In a device of the character described, the combination of a foot, hooks spaced from each other on the front end of said foot for engagement with the rim, a lever pivoted to the rear end of said foot, a tire-engaging part carried by said lever, and working between the hooks, and a lever for rocking said foot upon the rim as a fulcrum.

2. In a device of the character described, the combination of a foot, hooks spaced from each other on the front end of said foot, for engagement with the rim, a lever pivoted to the rear end of said foot, a tire-engaging part carried by said lever, and working between the hooks, and a bifurcated lever connected to the foot adjacent said hooks, for rocking said foot with the rim as a fulcrum.

3. In a device of the character described, the combination of a foot, 5, provided with separated rim-engaging hooks, 6, a lever rigidly connected with said foot, adjacent said hooks, and straddling the space therebetween, a second lever, 16, pivotally connected to said foot at a point relatively remote from said hooks, and an arm, 17, extending from said lever to work through the bifurcated portion of the first said lever and between the hooks.

4. In a device of the character described, the combination of a foot, 5, provided with separated rim-engaging hooks, 6, a lever, 8, rigidly connected with said foot, adjacent said hooks, and straddling the space therebetween, a second lever, 16, pivotally connected to said foot at a point relatively remote from said hooks, and an arched arm, 17, extending from said lever to work through the bifurcated portion of the first said lever and between the hooks, said arm being provided with a concaved end.

In testimony whereof I hereunto set my hand in the presence of two witnesses.

THOMAS W. LUCKE.

In the presence of—
MARY F. ALLEN,
MYRTLE WUENCHMAN.